(12) United States Patent
Hsu et al.

(10) Patent No.: US 9,306,904 B2
(45) Date of Patent: Apr. 5, 2016

(54) TRANSMISSION SYSTEM AND METHOD FOR NETWORK ADDRESS TRANSLATION TRAVERSAL

(71) Applicant: Institute For Information Industry, Taipei (TW)

(72) Inventors: Chun-Yen Hsu, Taipei (TW); Chiu-Wen Chen, Taipei (TW); Whai-En Chen, Yilan (TW); Chun-Chieh Chiu, Wujie Township (TW)

(73) Assignee: Institute For Information Industry, Taipei (TW)

( * ) Notice: Subject to any disclaimer, the term of this patent is extended or adjusted under 35 U.S.C. 154(b) by 129 days.

(21) Appl. No.: 13/860,249

(22) Filed: Apr. 10, 2013

(65) Prior Publication Data

US 2013/0268682 A1    Oct. 10, 2013

Related U.S. Application Data

(60) Provisional application No. 61/622,015, filed on Apr. 10, 2012.

(51) Int. Cl.
*G06F 15/16* (2006.01)
*H04L 29/12* (2006.01)
*H04W 4/00* (2009.01)

(52) U.S. Cl.
CPC .......... *H04L 61/256* (2013.01); *H04L 61/2567* (2013.01); *H04L 61/2592* (2013.01); *H04L 61/1511* (2013.01); *H04W 4/005* (2013.01)

(58) Field of Classification Search
CPC ............................ H04L 29/12; H04L 61/2514
See application file for complete search history.

(56) References Cited

U.S. PATENT DOCUMENTS 7,143,187 B1    11/2006    Takeda et al.
7,453,850 B2    11/2008    Yang et al.
(Continued)

FOREIGN PATENT DOCUMENTS

CN    102082837 A    6/2011
CN    102148767 A    8/2011
(Continued)

OTHER PUBLICATIONS

Office Action to the corresponding Taiwanese Patent Application rendered by the Taiwan Intellectual Property Office (TIPO) on Apr. 29, 2015, 7 pages (including English translation).
(Continued)

*Primary Examiner* — Umar Cheema
*Assistant Examiner* — Tesfu Mekonen
(74) *Attorney, Agent, or Firm* — Skaar Ulbrich Macari, P.A.

(57) ABSTRACT

A transmission system and a transmission method for network address translation traversal are provided. The transmission system includes a private network device, a network address record device, a public network device and a network address translation server. The network address record device records an inner network address of the private network device and an outer network address corresponding to the inner network address. The public network device inquires the inner network address of the private network device and the outer network address corresponding to the inner network address from the network address record device, and generates a packet according to the inner network address and the outer network address corresponding to the inner network address. The network address translation server receives the packet from the public network device, and transmits the packet to the public network device.

10 Claims, 8 Drawing Sheets

(56) References Cited

U.S. PATENT DOCUMENTS

| | | | |
|---|---|---|---|
| 7,478,169 | B2 | 1/2009 | Banerjee et al. |
| 7,826,602 | B1 * | 11/2010 | Hunyady et al. ........... 379/93.09 |
| 7,983,254 | B2 | 7/2011 | Alt et al. |
| 8,145,733 | B1 * | 3/2012 | Cheng et al. .................. 709/220 |
| 8,554,946 | B2 * | 10/2013 | Runeson et al. .............. 709/238 |
| 8,676,933 | B2 * | 3/2014 | Hwang et al. ................. 709/219 |
| 8,767,590 | B2 * | 7/2014 | Tseng ........................... 370/260 |
| 2003/0193912 | A1 | 10/2003 | O'Neill |
| 2009/0245233 | A1 | 10/2009 | Prasad et al. |
| 2010/0094978 | A1 | 4/2010 | Runeson |
| 2010/0182995 | A1 | 7/2010 | Hwang |
| 2011/0182183 | A1 * | 7/2011 | Perkins ........................ 370/235 |
| 2012/0042082 | A1 * | 2/2012 | Liao et al. .................... 709/227 |

FOREIGN PATENT DOCUMENTS

| | | |
|---|---|---|
| CN | 102318323 A | 1/2012 |
| EP | 1263171 A1 | 12/2002 |
| WO | 2002035801 A2 | 5/2002 |
| WO | 2010043440 A1 | 4/2010 |

OTHER PUBLICATIONS

Office Action to the corresponding Chinese Patent Application rendered by the State Intellectual Property Office of China (SIPO) on Nov. 26, 2015, 11 pages (including English translation).

* cited by examiner

TRANSMISSION SYSTEM AND METHOD FOR NETWORK ADDRESS TRANSLATION TRAVERSAL

PRIORITY

This application claims priority to U.S. Provisional Patent Application No. 61/622,015 filed on Apr. 10, 2012, which is hereby incorporated by reference in its entirety.

FIELD

The present invention relates to a transmission system and a transmission method; and more particularly, to a transmission system and a transmission method for network address translation traversal.

BACKGROUND

Network address translation (NAT) is a technology by which a source network address and a destination network address are rewritten when a network address packet passes through the NAT or a firewall with the NAT Function. In this way, a plurality of devices in a private network (e.g., in a company or a house) can be connected to the Internet through only a single public network address to communicate with devices in the public network. With the NAT technology, the problem that it is difficult to reserve network addresses in the Internet due to the limited number of IPv4 network addresses can be effectively solved. However, the NAT technology also makes communications among different hosts more complex.

In the current NAT communication networks, a device in a private network can directly communicate with a device in a public network via an NAT server. On the other hand, it is impossible for the device in the public network to communicate with the device in the private network directly via the NAT server unless the network address mapping data corresponding to the device in the private network have been created. However, in terms of the current network technologies, a need may exist for the device in the public network to be connected to the device in the private network (e.g., the peer-to-peer (P2P) technology, the Voice over IP (VoIP) technology, and etc.). For this reason, the NAT traversal is considered to be a technology capable of solving the problem that the device in the public network cannot directly communicate with the device in the private network.

According to the NAT traversal technology, the device in the public network must obtain the network address mapping data (i.e., data for mapping between an inner network address of the device in the private network and an outer network address corresponding to the inner network address obtained through translation by the NAT server) corresponding to the device in the private network in order to properly communicate with the device in the private network. However, in the current NAT communication networks, there still lacks a standardized mechanism that can create the network address mapping data without changing the existing NAT communication network framework.

Accordingly, an urgent need still exists in the art to provide a solution capable of effectively creating network address mapping data corresponding to a device in the private network without changing the existing NAT communication network framework so that the device in the public network can communicate with the device in the private network according to the network address mapping data.

SUMMARY

The primary objective of the present invention is to provide a solution capable of effectively creating network address mapping data corresponding to a device in a private network without changing the existing NAT communication network framework so that a device in a public network can communicate with the device in the private network according to the network address mapping data. Specifically in certain embodiments of the present invention, the network address mapping data (i.e., data for mapping between an inner network address of the device in the private network and an outer network address corresponding to the inner network address obtained through translation by the NAT server) corresponding to the device in the private network are created in advance and recorded in a predetermined device in the existing NAT communication network. Then, the device in the public network can inquire the network address mapping data from the predetermined device and communicate with the device in the private network according to the network address mapping data.

To achieve the aforesaid objective, certain embodiments of the present invention provide a transmission system for network address translation traversal. The transmission system comprises a private network device, a network address record device, a public network device and a network address translation server. The network address record device is configured to record an inner network address of the private network device and an outer network address corresponding to the inner network address. The outer network address corresponding to the inner network address is an address of the private network device in the public network. The public network device is configured to inquire the inner network address of the private network device and the outer network address corresponding to the inner network address from the network address record device, and generate a packet according to the inner network address and the outer network address corresponding to the inner network address. The network address translation server is configured to receive the packet from the public network device and transmit the packet to the private network device.

Another objective of certain embodiments of the present invention is to provide a transmission method for network address translation traversal, comprising the following steps of:

(a) enabling a network address record device to record an inner network address of a private network device and an outer network address corresponding to the inner network address;

(b) enabling a public network device to inquire the inner network address of the private network device and the outer network address corresponding to the inner network address from the network address record device, and generate a packet according to the inner network address and the outer network address corresponding to the inner network address; and (c) enabling a network address translation server to receive the packet from the public network device and transmit the packet to the private network device.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific examples, embodiments, environment, applications or particular implementations described in these embodiments. Therefore, description of these example embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
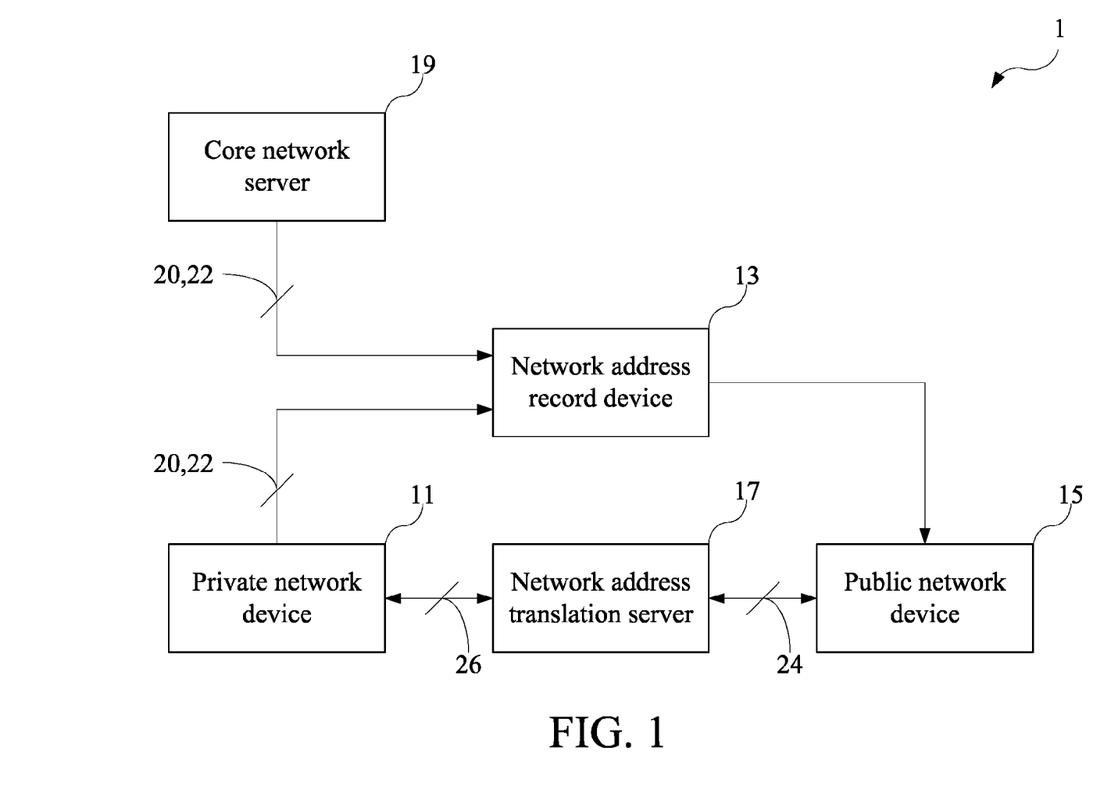
FIG. 1 is a schematic structural view of a transmission system according to a first embodiment of the present invention.

A first embodiment of the present invention is a transmission system for network address translation (NAT) traversal. As shown in FIG. 1, the transmission system 1 of this embodiment comprises a private network device 11, a network address record device 13, a public network device 15, a network address translation server 17 and a core network server 19. In other embodiments, the transmission system 1 may comprise a plurality of private network devices 11, and each of the private network devices 11 may be substantially considered as and execute the same operations and functions as the private network device 11 described in this embodiment.

The network address record device 13 can be implemented by a predetermined device in the existing NAT communication network system, and can be implemented by different devices in different NAT communication networks without affecting practical operations of the invention.

The network address record device 13 is configured to record an inner network address 20 of the private network device 11 and an outer network address 22 corresponding to the inner network address 20. The inner network address 20 is a private network address of the private network device 11 in a private network, and the outer network address 22 corresponding to the inner network address 20 is a public network address that is translated from the inner network address 20 by the network address translation server 17 and that can be recognized in the public network. In other embodiments, in order to extend the application scope, the inner network address 20 of the private network device 11 may further comprise an inner port, and the outer network address 22 corresponding to the inner network address 20 may further comprise an outer port.

The core network server 19 may be implemented differently depending on different NAT communication network systems without affecting practical operations of the present invention. The core network server 19 is configured to perform a predetermined procedure with the private network device 11 to create the inner network address 20 of the private network device 11 and the outer network address 22 corresponding to the inner network address 20. Details of the predetermined procedure vary with different NAT communication network systems, but the purpose of the predetermined procedure will remain the same (i.e., to create the inner network address 20 of the private network device 11 and the outer network address 22 corresponding to the inner network address 20).

Upon completion of the predetermined procedure, both the private network device 11 and the core network server 19 will know the inner network address 20 of the private network device 11 and the outer network address 22 corresponding to the inner network address 20. Then, the inner network address 20 of the private network device 11 and the outer network address 22 corresponding to the inner network address 20 are transmitted by one of the private network device 11 and the core network server 19 to the network address record device 13 so that the network address record device 13 can record and update the inner network address 20 and the outer network address 22 corresponding to the inner network address 20 that are received.

Because the inner network address 20 of the private network address 11 and the outer network address 22 corresponding to the inner network address 20 are continuously recorded and updated into the network address record device 13, the public network device 15 can inquire the inner network address 20 of the private network device 11 and the outer network address 22 corresponding to the inner network address 20 from the network address record device 13 at any time when it desires to communicate with the private network device 11. Once the inner network address 20 of the private network device 11 and the outer network address 22 corresponding to the inner network address 20 have been known by the public network device 15 through inquiry procedure, the public network device 15 can generate a packet 24 according to the inner network address 20 and the outer network address 22 corresponding to the inner network address 20 to communicate with the private network device 11 via the packet 24.

Then, the public network device 15 transmits the packet 24 generated to the NAT server 17. The NAT server 17 is configured to receive the packet 24 from the public network device 15 and transmit the packet 26 to the private network device 11. Generally, a header of the packet 24 generated by the public network device 15 comprises the outer network address 22 corresponding to the inner network address 20. The NAT server 17 will remove the header comprising the outer network address 22 corresponding to the inner network address 20 from the packet 24 after receiving the packet 24, and then transmit the packet 26 comprising only the inner network address 20 to the private network device 11.

Through the operations disclosed above, the public network device 15 in the transmission system 1 will be able to communicate with the private network device 11 effectively, and the purpose of NAT traversal can be achieved without changing the existing NAT communication network framework.

A second embodiment of the present invention is a transmission system for network address translation traversal. The transmission system of this embodiment is applicable to Machine-Type Communications (MTC) in 3GPP ($3^{rd}$ Generation Partnership Project), but this is not intended to limit implementations of the present invention.

Figure 2A:
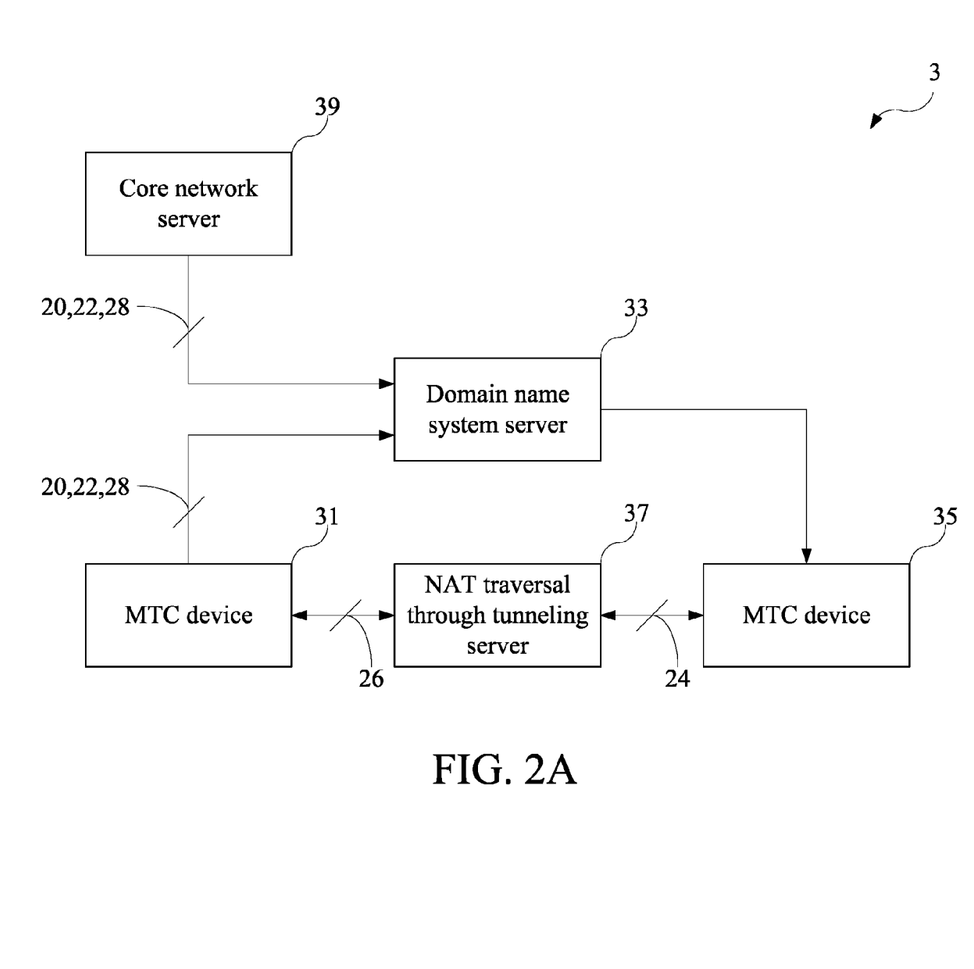
FIG. 2A is a schematic structural view of a transmission system according to a second embodiment of the present invention.

According to the NAT traversal through tunneling technology set forth in Section 6.18 of 3GPP Document No. TR 23.888, the transmission system 3 of this embodiment may be as shown in FIG. 2A. Specifically, the transmission system 3 comprises an MTC device 31, a domain name system server 33, a MTC device 35, an NAT traversal through tunneling server 37 and a core network server 39. In other embodiments, the transmission system 3 may comprise a plurality of MTC devices 31, and each of the MTC devices 31 may be substantially considered as and execute the same operations and functions as the MTC device 31 described in this embodiment.

The MTC device 31, the domain name system server 33, the MTC device 35, the NAT traversal through tunneling server 37 and the core network server 39 described in this embodiment may correspond to and substantially execute the same operations and functions as the private network device 11, the network address record device 13, the public network device 15, the NAT server 17 and the core network server 19 described in the first embodiment respectively. Therefore, only differences between this embodiment and the first embodiment will be described hereinafter.

In this embodiment, the core network server 39 may comprise a Mobility Management Entity (MME), a Serving Gateway (SGW), a Packet Data Network Gateway (PGW), a Home Subscriber Server (HSS), an Authentication Authorization Accounting (AAA) device and so on. Because operations of such devices can be readily known from the NAT traversal through tunneling specification, only aspects of these devices that are substantially related to the present invention will be further described hereinafter.

Figure 2B:
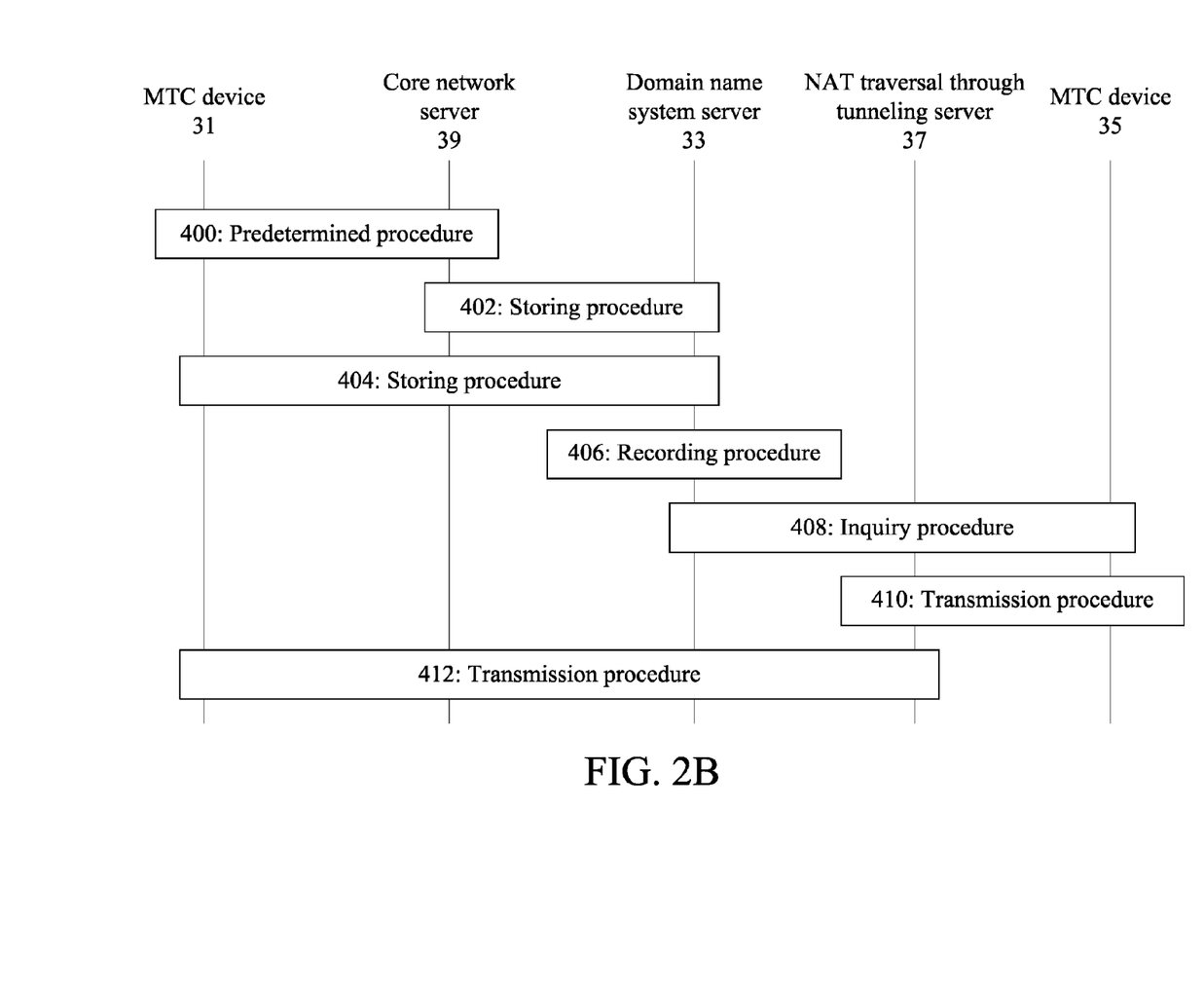
FIG. 2B is a schematic view illustrating operations of the transmission system according to the second embodiment of the present invention.

FIG. 2B is a schematic view illustrating operations of the transmission system 3. As shown in FIG. 2B, the MTC device 31 deployed in the private network can perform a predetermined procedure 400 with the core network server 39 to create an inner network address 20 of the MTC device 31 and an outer network address 22 corresponding to the inner network address 20. Because the specific process flow of the predetermined procedure 400 has been specified in 3GPP Document No. TS 23.401, no further description will be made herein. In other embodiments, in order to extend the application scope, the inner network address 20 of the MTC device 31 may further comprise an inner port, and the outer network address 22 corresponding to the inner network address 20 may further comprise an outer port.

After the inner network address 20 of the MTC device 31 and the outer network address 22 corresponding to the inner network address 20 have been created, one of a storing procedure 402 and a storing procedure 404 will be executed. The storing procedure 402 and the storing procedure 404 are initiated by the core network server 39 and the MTC device 31 respectively. The storing procedure 402 and the storing procedure 404 are used to transmit a fully qualified domain name 28 of the MTC device 31, the inner network address 20 and the outer network address 22 corresponding to the inner network address 20 to the domain name system server 33 so that the inner network address 20 of the MTC device 31 and the outer network address 22 corresponding to the inner network address 20 can be recorded or updated by the domain name system server 33.

In the storing procedure 402, firstly the MME in the core network server 39 transmits the inner network address 20 of the MTC device 31 and the outer network address 22 corresponding to the inner network address 20 to the HSS/AAA device, and then the HSS/AAA device in the core network server 39 transmits the fully qualified domain name 28 of the MTC device 31, the inner network address 20 of the MTC device 31 and the outer network address 22 corresponding to the inner network address 20 to the domain name system server 33. In the storing procedure 404, the MTC device 31 transmits the fully qualified domain name 28 of the MTC device 31, the inner network address 20 of the MTC device 31 and the outer network address 22 corresponding to the inner network address 20 to the domain name system server 33 directly.

After receiving the fully qualified domain name 28 of the MTC device 31, the inner network address 20 of the MTC device 31 and the outer network address 22 corresponding to the inner network address 20 from the MTC device 31 or the core network server 39, the domain name system server 33 located in the application layer will initiate a recording procedure 406. In the recording procedure 406, the domain name system server 33 will, in response to the fully qualified domain name of the MTC device 21, record the inner network address 20 of the MTC device 31 and the outer network address 22 corresponding to the inner network address 20 according to a domain name system SRV protocol and pursuant to one of a predetermined order, a priority token and a weight token.

The domain name system SRV protocol is used to set the predetermined order, the priority token or the weight token in advance so that the domain name system server 33 records the inner network address 20 of the MTC device 31 and the outer network address 22 corresponding to the inner network address 20 in sequence according to the predetermined order, the priority token or the weight token. For example, if the predetermined order, the priority token or the weight token indicates an order in which the inner network address 20 is followed by the outer network address 22 corresponding to the inner network address 20, then the domain name system server 33 will record firstly the inner network address 20 and then the outer network address 22 corresponding to the inner network address 20. Conversely, if the predetermined order, the priority token or the weight token indicates an order in which the inner network address 20 follows the outer network address 22 corresponding to the inner network address 20, then the domain name system server 33 will record firstly the outer network address 22 corresponding to the inner network address 20 and then the inner network address 20. Through use of the domain name system SRV protocol, inquiry of the inner network address 20 of the MTC device 31 and the outer network address 22 corresponding to the inner network address 20 becomes well regulated.

In other embodiments, the domain name system server 33 may further initiate a storage confirming procedure (not shown) after completion of the recording procedure 406 to inform the core network server 39 or the MTC device 31 that: the domain name system server 33 has successfully recorded and updated the inner network address 20 of the MTC device 31 and the outer network address 22 corresponding to the inner network address 20 according to the domain name system SRV protocol.

The inner network address 20 of the MTC device 31 and the outer network address 22 corresponding to the inner network address 20 will be continuously recorded and updated into the domain name system server 33. If the MTC device 35 in the public network desires to communicate with the MTC device 31 in the private network, the MTC device 35 will further initiate an inquiry procedure 408.

In the inquiry procedure 408, the MTC device 35 sends an inquiry message to the domain name system server 33, with a targeted object of the inquiry message being the MTC device 31 corresponding to the fully qualified domain name 28. Then, the inner network address 20 of the MTC device 31 corresponding to the fully qualified domain name 28 and the outer network address 22 corresponding to the inner network address 20 are inquired from the domain name system server 33 according to the domain name system SRV protocol and pursuant to one of the predetermined order, the priority token and the weight token.

After having inquired the inner network address 20 of the MTC device 31 corresponding to the fully qualified domain name 28 and the outer network address 22 corresponding to the inner network address 20, the MTC device 35 initiates a transmission procedure 410. In the transmission procedure 410, the MTC device 35 generates a packet 24 according to the inner network address 20 and the outer network address 22 corresponding to the inner network address 20 that have been inquired, and transmits the packet 24 to the NAT traversal through tunneling server 37. Here, a header of the packet 24 comprises the inner network address 20 of the MTC device 31 and the outer network address 22 corresponding to the inner network address 20.

The NAT traversal through tunneling server 37 initiates a transmission procedure 412 after receiving the packet 24. In the transmission procedure 412, the NAT traversal through tunneling server 37 removes the outer network address 22 corresponding to the inner network address 20 from the header of the packet 24 and then transmits the packet 26 whose header comprises only the inner network address 20 to the MTC device 31. In this embodiment, the NAT traversal through tunneling server 37 firstly transmits the packet 26 to the serving gateway/the packet data network gateway in the core network server 39, which then transmits the packet 26 to the MTC device 31.

A third embodiment of the present invention is a transmission system for network address translation traversal. The transmission system of this embodiment is applicable to MTC communications of 3GPP, but this is not intended to limit implementations of the present invention.

Figure 3A:
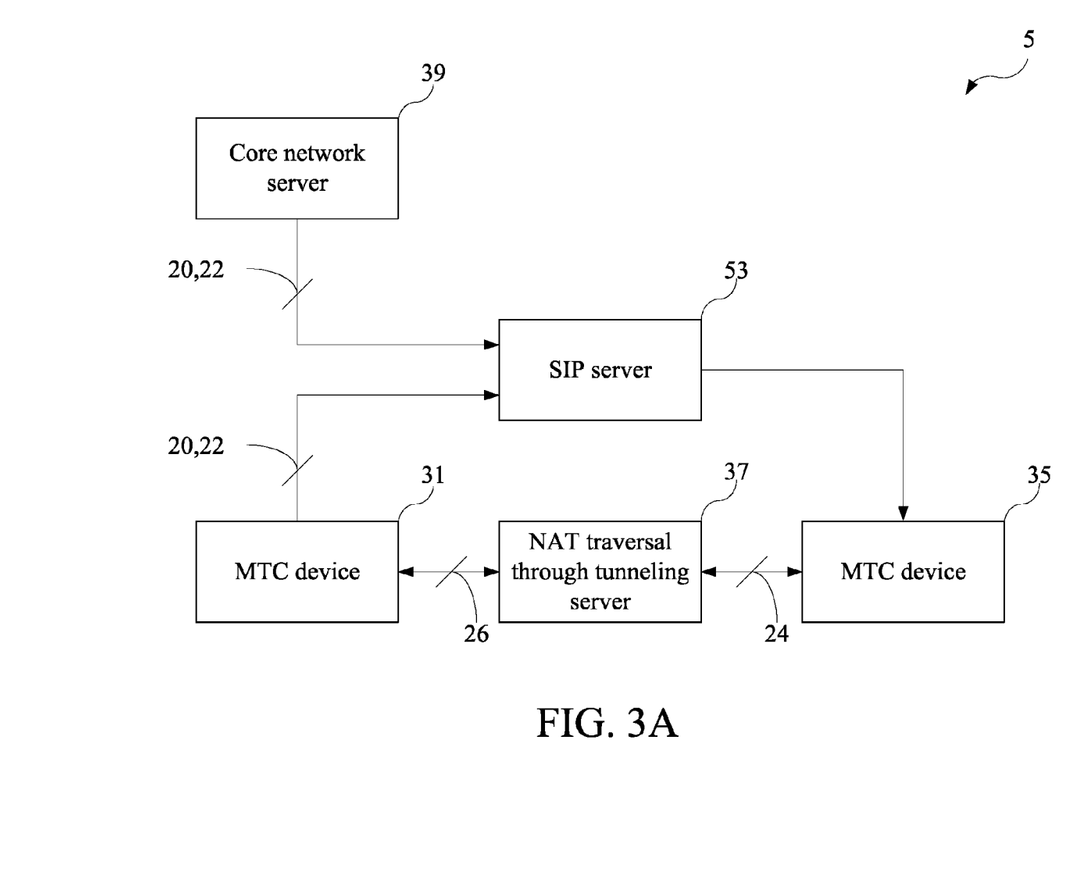
FIG. 3A is a schematic structural view of a transmission system according to a third embodiment of the present invention.

According to the NAT traversal through tunneling technology set forth in Section 6.18 of 3GPP Document No. TR 23.888, the transmission system 5 of this embodiment may be as shown in FIG. 3A. Specifically, the transmission system 5 comprises an MTC device 31, a session initiation protocol (SIP) server 53, an MTC device 35, an NAT traversal through tunneling server 37 and a core network server 39. In other embodiments, the transmission system 5 may comprise a plurality of MTC devices 31, and each of the MTC devices 31 may be substantially considered as and execute the same operations and functions as the MTC device 31 described in this embodiment.

The SIP server 53 of this embodiment may be considered as and substantially execute the same operations and functions as the network address record device 13 described in the first embodiment. The MTC device 31, the MTC device 35, the NAT traversal through tunneling server 37 and the core network server 39 described in this embodiment may correspond to and substantially execute the same operations and functions as the MTC device 31, the MTC device 35, the NAT traversal through tunneling server 37 and the core network server 39 described in the second embodiment respectively. Therefore, only differences between this embodiment and the second embodiment will be described hereinafter.

Figure 3B:
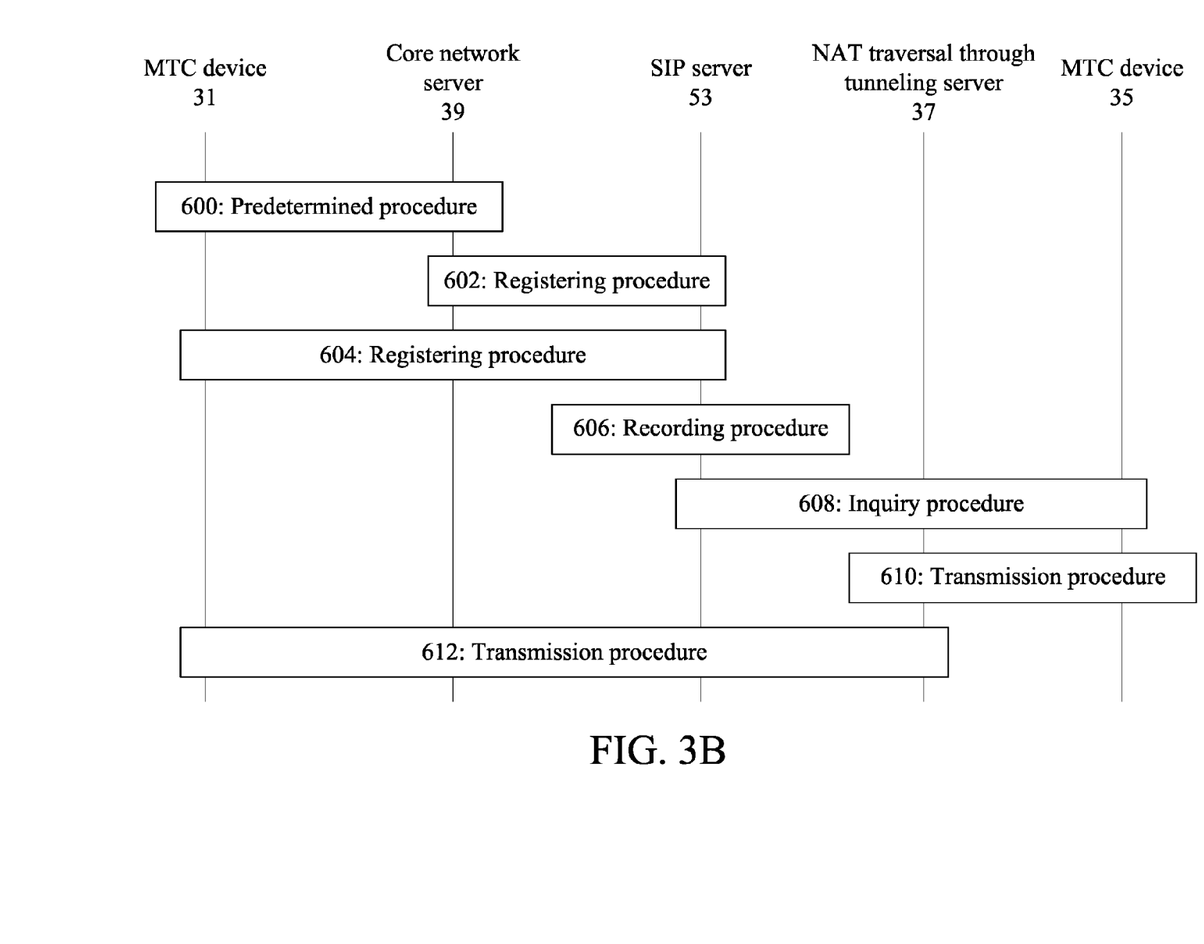
FIG. 3B is a schematic view illustrating operations of the transmission system according to the third embodiment of the present invention.

FIG. 3B is a schematic view illustrating operations of the transmission system 5. As shown in FIG. 3B, the MTC device 31 deployed in the private network may perform a predetermined procedure 600 with the core network server 39 to create an inner network address 20 of the MTC device 31 and an outer network address 22 corresponding to the inner network address 20. The predetermined procedure 600 described in this embodiment is substantially the same as the predetermined procedure 400 described in the second embodiment, so it will not be further described herein. In other embodiments, in order to extend the application scope, the inner network address 20 of the MTC device 31 may further comprise an inner port, and the outer network address 22 corresponding to the inner network address 20 may further comprise an outer port.

After the inner network address 20 of the MTC device 31 and the outer network address 22 corresponding to the inner network address 20 have been created, one of a registering procedure 602 and a registering procedure 604 is executed. The registering procedure 602 and the registering procedure 604 are initiated by the core network server 39 and the MTC device 31 respectively, and are both used to transmit the inner network address 20 of the MTC device 31 and the outer network address 22 corresponding to the inner network address 20 to the SIP server 53 so that the inner network address 20 of the MTC device 31 and the outer network address 22 corresponding to the inner network address 20 can be recorded or updated by the SIP server 53.

In the registering procedure 602, firstly the MME in the core network server 39 transmits the inner network address 20 of the MTC device 31 and the outer network address 22 corresponding to the inner network address 20 to the HSS/AAA device, and then the HSS/AAA device in the core network server 39 transmits the inner network address 20 of the MTC device 31 and the outer network address 22 corresponding to the inner network address 20 to the SIP server 53. In the registering procedure 604, the MTC device 31 transmits the inner network address 20 of the MTC device 31 and the outer network address 22 corresponding to the inner network address 20 to the SIP server 53 directly.

After receiving the inner network address 20 of the MTC device 31 and the outer network address 22 corresponding to the inner network address 20 from the MTC device 31 or the core network server 39, the SIP server 53 residing in the application layer will initiate a recording procedure 606. In the recording procedure 606, the SIP server 53 labels the inner network address 20 of the MTC device 31 and the outer network address 22 corresponding to the inner network address 20 respectively according to a session initiation protocol, and then records the labeled inner network address 20 and the labeled outer network address 22 corresponding to the inner network address 20.

Furthermore, the SIP server 53 can establish a mapping table comprising a plurality of fields. Then, the SIP server 53 having received the inner network address 20 and the outer network address 22 corresponding to the inner network address 20 may label the inner network address 20 as "inner" and the outer network address 22 corresponding to the inner network address 20 as "outer", and record the labeled inner network address 20 and the labeled outer network address 22 corresponding to the inner network address 20 into one of the fields of the mapping table (e.g., the field "contact"). As an example, the labeled inner network address 20 stored in the field "contact" may be represented as "contact: <192.168.0.10>;inner", and the labeled outer network address 22 corresponding to the inner network address 20 stored in the field "contact" may be represented as "contact: <192.168.1.1>;outer".

In other embodiments, the SIP server 53 may further initiate a registration confirming procedure (not shown) after completion of the recording procedure 606 to inform the core network server 39 or the MTC device 31 that: the SIP server 53 has successfully labeled and recorded the inner network address 20 of the MTC device 31 and the outer network address 22 corresponding to the inner network address 20 according to the session initiation protocol.

The inner network address 20 of the MTC device 31 and the outer network address 22 corresponding to the inner network address 20 will be continuously labeled and recorded into the SIP server 53. If the MTC device 35 in the public network desires to communicate with the MTC device 31 in the private network, the MTC device 35 will further initiate an inquiry procedure 608.

In the inquiry procedure 608, the MTC device 35 sends an inquiry message to the SIP server 53, with a targeted object of the inquiry message being the field (e.g., the field "contact") of the aforesaid mapping table. Then, the inner network address 20 of the MTC device 31 and the outer network address 22 corresponding to the inner network address 20 are inquired from the SIP server 53 according to the session initiation protocol. Because the inner network address 20 and the outer network address 22 corresponding to the inner network address 20 that are stored in the mapping table have both been labeled, the MTC device 35 can learn, according to the session initiation protocol, whether the network address obtained through the inquiry procedure corresponds to the inner network address 20 or to the outer network address 22 corresponding to the inner network address 20.

The MTC device 35 initiates a transmission procedure 610 after having inquired the inner network address 20 of the MTC device 31 and the outer network address 22 corresponding to the inner network address 20 that correspond to the field (e.g., the field "contact") of the mapping table. In the transmission procedure 610, the MTC device 35 generates a packet 24 according to the inner network address 20 and the outer network address 22 corresponding to the inner network address 20 that have been inquired, and transmits the packet 24 to the NAT traversal through tunneling server 37. Here, a header of the packet 24 comprises the inner network address 20 of the MTC device 31 and the outer network address 22 corresponding to the inner network address 20. The predetermined procedure 610 described in this embodiment is substantially the same as the predetermined procedure 410 described in the second embodiment.

The NAT traversal through tunneling server 37 initiates a transmission procedure 612 after receiving the packet 24. In the transmission procedure 612, the NAT traversal through tunneling server 37 removes the outer network address 22 corresponding to the inner network address 20 from the header of the packet 24 and then transmits the packet 26 whose header comprises only the inner network address 20 to the MTC device 31. In this embodiment, firstly the NAT traversal through tunneling server 37 transmits the packet 26 to the serving gateway/the packet data network gateway in the core network server 39, which then transmits the packet 26 to the MTC device 31. The predetermined procedure 612 described in this embodiment is substantially the same as the predetermined procedure 412 described in the second embodiment.

A fourth embodiment of the present invention is a transmission method for network address translation traversal. The transmission method of this embodiment is applicable to the transmission system 1 of the first embodiment.

Figure 4:
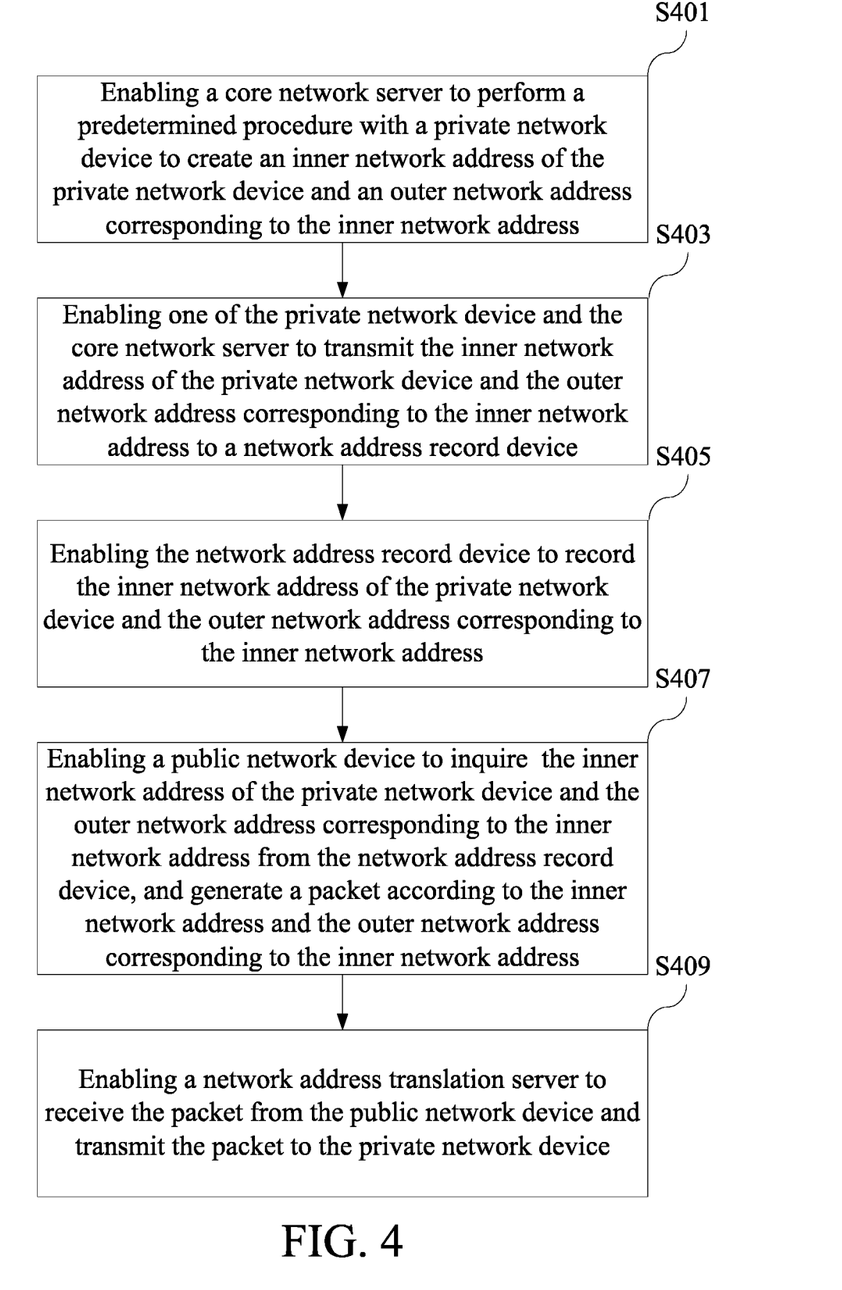
FIG. 4 is a flowchart diagram of a transmission method according to a fourth embodiment of the present invention.

FIG. 4 is a flowchart diagram of the transmission method of this embodiment. As shown in FIG. 4, step S401 is executed to enable a core network server to perform a predetermined procedure with a private network device to create an inner network address of the private network device and an outer network address corresponding to the inner network address. In other embodiments, the inner network address of the private network device further comprises an inner port, and the outer network address corresponding to the inner network address further comprises an outer port.

Step 403 is executed to enable one of the private network device and the core network server to transmit the inner network address of the private network device and the outer network address corresponding to the inner network address to a network address record device. Then, step S405 is executed to enable the network address record device to record the inner network address of the private network device and the outer network address corresponding to the inner network address.

Next, step S407 is executed to enable a public network device to inquire the inner network address of the private network device and the outer network address corresponding to the inner network address from the network address record device, and generate a packet according to the inner network address and the outer network address corresponding to the inner network address. Step S409 is executed to enable a network address translation server to receive the packet from the public network device and transmit the packet to the private network device.

The steps S405, S407 and S409 are essential steps of this embodiment, while the steps S401 and S403 are only used to illustrate an example of providing the network address record device with the inner network address of the private network device and the outer network address corresponding to the inner network address but are not intended to limit the present invention. In other embodiments, the steps S401 and S403 may be omitted or replaced by other steps.

In addition to the aforesaid steps, the fourth embodiment can also execute steps corresponding to all the operations of the transmission system 1 set forth in the first embodiment. How the fourth embodiment executes the corresponding steps will be readily appreciated by those of ordinary skill in the art based on the explanation of the first embodiment, and thus will not be further described herein.

A fifth embodiment of the present invention is a transmission method for network address translation traversal. The transmission method of this embodiment is applicable to the transmission system 3 of the second embodiment.

Figure 5:
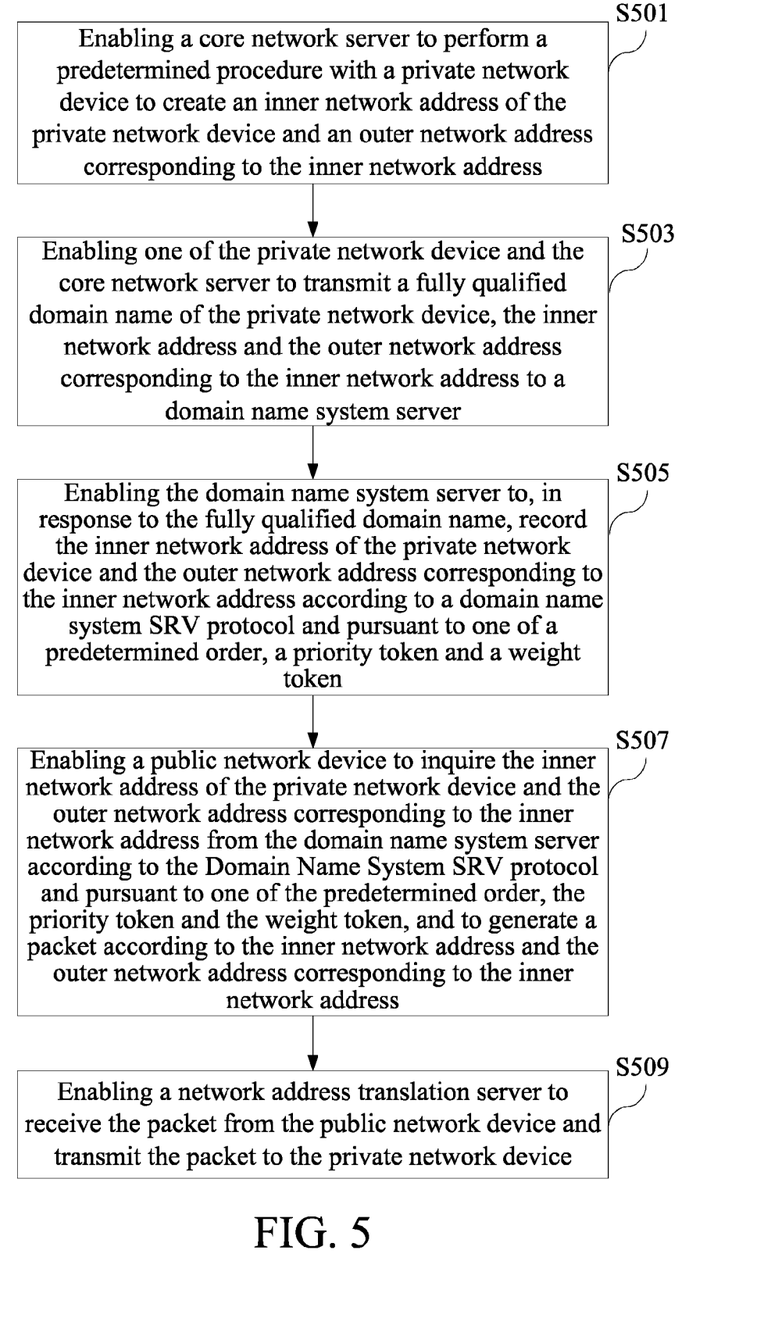
FIG. 5 is a flowchart diagram of a transmission method according to a fifth embodiment of the present invention.

FIG. 5 is a flowchart diagram of the transmission method of this embodiment. As shown in FIG. 5, step S501 is executed to enable a core network server to perform a predetermined procedure with a private network device to create an inner network address of the private network device and an outer network address corresponding to the inner network address. In other embodiments, the inner network address of the private network device further comprises an inner port, and the outer network address corresponding to the inner network address further comprises an outer port.

Step 503 is executed to enable one of the private network device and the core network server to transmit a fully qualified domain name of the private network device, the inner network address and the outer network address corresponding to the inner network address to a domain name system server. Then, step S505 is executed to enable the domain name system server to, in response to the fully qualified domain name, record the inner network address of the private network device and the outer network address corresponding to the inner network address according to a domain name system SRV protocol and pursuant to one of a predetermined order, a priority token and a weight token.

Next, step S507 is executed to enable a public network device to inquire the inner network address of the private network device and the outer network address corresponding to the inner network address from the domain name system server according to the Domain Name System SRV protocol and pursuant to one of the predetermined order, the priority token and the weight token, and to generate a packet according to the inner network address and the outer network address corresponding to the inner network address. Then, step S509 is executed to enable a network address translation server to receive the packet from the public network device and transmit the packet to the private network device.

The steps S505, S507 and S509 are essential steps of this embodiment, while the steps S501 and S503 are only used to illustrate an example of providing the domain name system server with the inner network address of the private network device and the outer network address corresponding to the inner network address but are not intended to limit the present invention. In other embodiments, the steps S501 and S503 may be omitted or replaced by other steps.

In addition to the aforesaid steps, the fifth embodiment can also execute steps corresponding to all the operations of the transmission system 3 set forth in the second embodiment. How the fifth embodiment executes the corresponding steps will be readily appreciated by those of ordinary skill in the art based on the explanation of the second embodiment, and thus will not be further described herein.

A sixth embodiment of the present invention is a transmission method for network address translation traversal. The transmission method of this embodiment is applicable to the transmission system 5 of the third embodiment.

Figure 6:
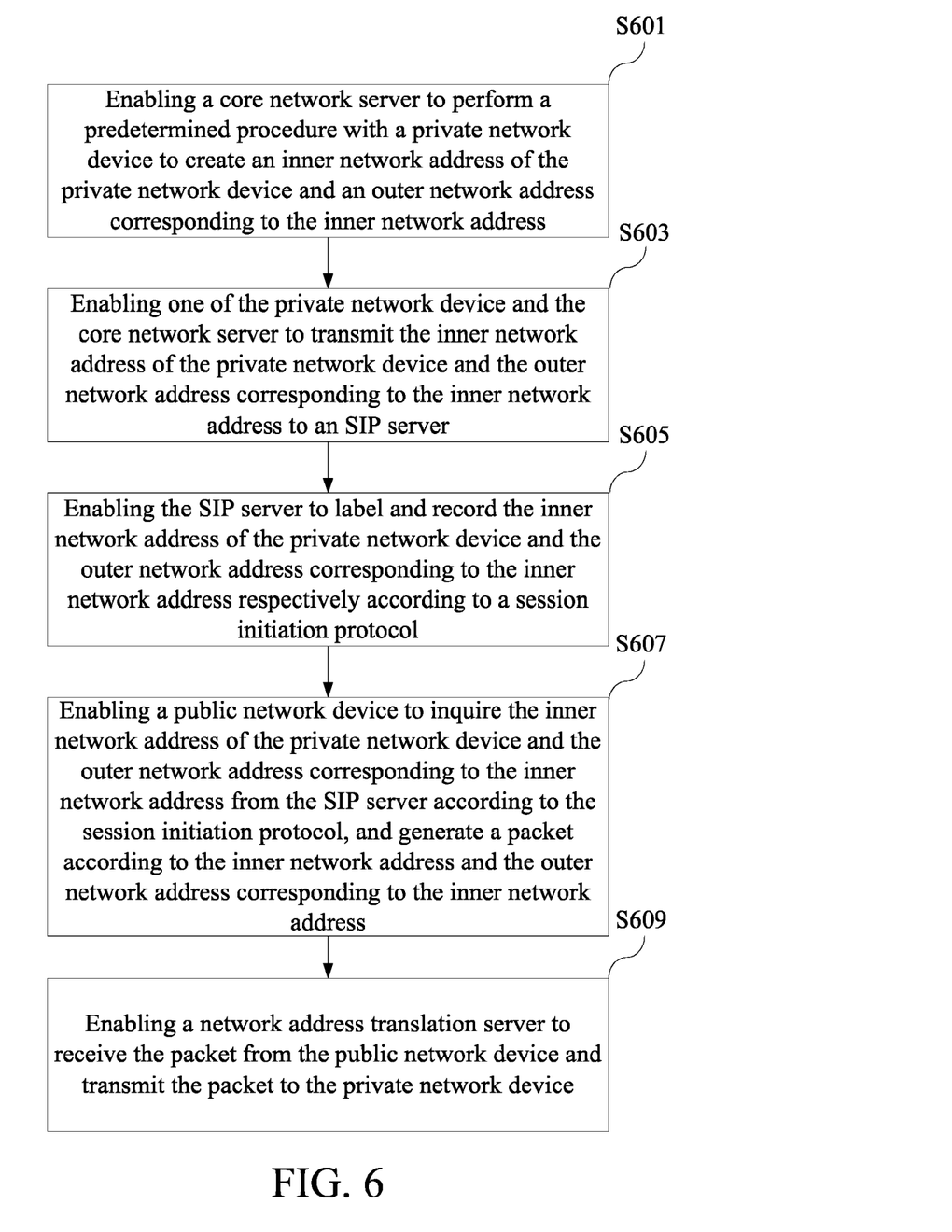
FIG. 6 is a flowchart diagram of a transmission method according to a sixth embodiment of the present invention.

FIG. 6 is a flowchart diagram of the transmission method of this embodiment. As shown in FIG. 6, step S601 is executed to enable a core network server to perform a predetermined procedure with a private network device to create an inner network address of the private network device and an outer network address corresponding to the inner network address. In other embodiments, the inner network address of the private network device further comprises an inner port, and the outer network address corresponding to the inner network address further comprises an outer port.

Step 603 is executed to enable one of the private network device and the core network server to transmit the inner network address of the private network device and the outer network address corresponding to the inner network address to an SIP server. Then, step S605 is executed to enable the SIP server to label and record the inner network address of the private network device and the outer network address corresponding to the inner network address respectively according to a session initiation protocol.

Next, step S607 is executed to enable a public network device to inquire the inner network address of the private network device and the outer network address corresponding to the inner network address from the SIP server according to the session initiation protocol, and generate a packet according to the inner network address and the outer network address corresponding to the inner network address. Step S609 is executed to enable a network address translation server to receive the packet from the public network device and transmit the packet to the private network device.

The steps S605, S607 and S609 are essential steps of this embodiment, while the steps S601 and S603 are only used to illustrate an example of providing the SIP server with the inner network address of the private network device and the outer network address corresponding to the inner network address but are not intended to limit the present invention. In other embodiments, the steps S601 and S603 may be omitted or replaced by other steps.

In addition to the aforesaid steps, the sixth embodiment can also execute steps corresponding to all the operations of the transmission system 5 set forth in the third embodiment. How the sixth embodiment executes the corresponding steps will be readily appreciated by those of ordinary skill in the art based on the explanation of the third embodiment, and thus will not be further described herein.

According to the above descriptions, the present invention provides a transmission system and a transmission method for network address translation traversal. In the transmission system and the transmission method, network address mapping data (i.e., data for mapping between an inner network address of the device in the private network and an outer network address corresponding to the inner network address obtained through translation by the NAT server) corresponding to the device in the private network are created in advance and recorded in a predetermined device in the existing NAT communication network. Then, the device in the public network can inquire the network address mapping data from the predetermined device and communicate with the device in the private network according to the network address mapping data. In this way, the present invention allows the device in the public network to communicate with the device in the private network without changing the existing NAT communication network framework.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A transmission system for network address translation traversal, comprising:
    a private network device;
    a network address record device, being configured to record an inner network address of the private network device and an outer network address corresponding to the inner network address;
    a public network device, being configured to inquire the inner network address of the private network device and the outer network address corresponding to the inner network address from the network address record device, and generate a packet according to the inner network address and the outer network address corresponding to the inner network address; and
    a network address translation server, being configured to receive the packet from the public network device and transmit the packet to the private network device
    wherein the network address record device is a domain name system server and is configured to:
    receive a fully qualified domain name of the private network device from one of the private network device and the core network server; and
    in response to the fully qualified domain name, record the inner network address of the private network device and the outer network address corresponding to the inner network address according to a Domain Name System SRV protocol and pursuant to one of a predetermined order, a priority token and a weight token.

2. The transmission system as claimed in claim 1, wherein the inner network address of the private network device further comprises an inner port, and the outer network address corresponding to the inner network address further comprises an outer port.

3. The transmission system as claimed in claim 1, further comprising a core network server, wherein the core network server is configured to perform a predetermined procedure with the private network device to create the inner network address of the private network device and the outer network address corresponding to the inner network address.

4. The transmission system as claimed in claim 3, wherein one of the private network device and the core network server transmits the inner network address of the private network device and the outer network address corresponding to the inner network address to the network address record device.

5. The transmission system as claimed in claim 1, wherein the public network device inquires the inner network address of the private network device and the outer network address corresponding to the inner network address from the network address record device according to the Domain Name System SRV protocol and pursuant to one of the predetermined order, the priority token and the weight token.

6. A transmission method for network address translation traversal, comprising the following steps of:
   (a) enabling a network address record device to record an inner network address of a private network device and an outer network address corresponding to the inner network address;
   (b) enabling a public network device to inquire the inner network address of the private network device and the outer network address corresponding to the inner network address from the network address record device, and generate a packet according to the inner network address and the outer network address corresponding to the inner network address; and
   (c) enabling a network address translation server to receive the packet from the public network device and transmit the packet to the private network device
   wherein the network address record device is a domain name system server, and the step (a) further comprises the following steps of:
      (a1) enabling the network address record device to receive a fully qualified domain name of the private network device from one of the private network device and the core network server; and
      (a2) in response to the fully qualified domain name, enabling the network address record device to record the inner network address of the private network device and the outer network address corresponding to the inner network address according to a Domain Name System SRV protocol and pursuant to one of a predetermined order, a priority token and a weight token.

7. The transmission method as claimed in claim 6, wherein the inner network address of the private network device further comprises an inner port, and the outer network address corresponding to the inner network address further comprises an outer port.

8. The transmission method as claimed in claim 6, further comprising the following step of:
   (d) enabling a core network server to, prior to the step (a), perform a predetermined procedure with the private network device to create the inner network address of the private network device and the outer network address corresponding to the inner network address.

9. The transmission method as claimed in claim 8, further comprising the following step of:
   (d) enabling one of the private network device and the core network server to, after the step (a) but before the step (d), transmit the inner network address of the private network device and the outer network address corresponding to the inner network address to the network address record device.

10. The transmission method as claimed in claim 6, wherein the step (b) further comprises the following step of:
   (b1) enabling the public network device to inquire the inner network address of the private network device and the outer network address corresponding to the inner network address from the network address record device according to the Domain Name System SRV protocol and pursuant to one of the predetermined order, the priority token and the weight token.

* * * * *